United States Patent [19]

Sekikawa

[11] Patent Number: 4,639,855
[45] Date of Patent: Jan. 27, 1987

[54] TOOL DISPLAY METHOD FOR LATHE EQUIPPED WITH NUMERICAL CONTROL UNIT

[75] Inventor: Katsuhide Sekikawa, Aichi, Japan

[73] Assignee: Mitsubishi Denki Kabushiki Kaisha, Tokyo, Japan

[21] Appl. No.: 669,185

[22] Filed: Nov. 7, 1984

[30] Foreign Application Priority Data

Nov. 7, 1983 [JP] Japan .................................. 58-208618

[51] Int. Cl.$^4$ ............................................. G06F 15/00
[52] U.S. Cl. ...................................... 364/188; 364/171
[58] Field of Search ............... 364/188, 189, 191, 192, 364/171, 474, 475; 340/679, 680

[56] References Cited

U.S. PATENT DOCUMENTS

| | | | |
|---|---|---|---|
| 4,490,781 | 12/1984 | Kishi | 364/171 |
| 4,513,366 | 4/1985 | Munekata | 364/191 |
| 4,521,860 | 6/1985 | Kanematsu | 364/474 |
| 4,530,046 | 7/1985 | Munekata | 364/171 |

*Primary Examiner*—Jerry Smith
*Assistant Examiner*—Allen MacDonald
*Attorney, Agent, or Firm*—Sughrue, Mion, Zinn, Macpeak, and Seas

[57] ABSTRACT

A tool display method for a numerically controlled lathe with which the configuration of a tool which conforms very closely to that of the actual tool can be displayed. Data representing a plurality of tool configuration types and dimensions of configurations of cutters as functions of a reference dimension according to the tool configuration types is stored in a memory of a numerical control unit body. A plurality of items of tool data are then inputted by operation of an input section, and an optimum tool configuration is selected in accordance with the tool data thus inputted. Dimensions of a cutter configuration according to the tool data are then calculated with reference to the optimum tool configuration type which has been selected. A tool mounting direction and whether or not a tool edge should be displayed are determined in accordance with the tool data. A tool configuration according to the selected optimum tool configuration type, the calculated dimensions of the cutter configuration, the tool mounting direction, and whether or not the edge of the tool should be displayed is then determined, and the tool configuration and a tool post configuration are synthesized into a turret configuration. The turret configuration is then displayed.

7 Claims, 17 Drawing Figures

| USE OF TOOL / B | DRL | TAP |
|---|---|---|
| B < 180° | ◁B | ⊏ |
| B = 180° | ⊏ |  |

FIG. 7

A: MAIN CUTTING EDGE ANGLE
B: AUX. CUTTING EDGE ANGLE

FIG. 9

$72° < A < 105°$
$B \geq 60°$

A: MAIN CUTTING EDGE ANGLE
B: AUX. CUTTING EDGE ANGLE
C: TOOL WIDTH

TOOL DISPLAY METHOD FOR LATHE EQUIPPED WITH NUMERICAL CONTROL UNIT

BACKGROUND OF THE INVENTION

The present invention relates to a tool display method for a numerically controlled lathe, and more particularly to a method for displaying the configuration of a machining tool used in such a lathe.

An NC (numerical control) unit is often used to control the position of a machining tool with respect to a workpiece to machine the latter. With an NC unit, products of intricate configuration can be readily manufactured with high accuracy while achieving excellent productivity.

A conventional tool display method used with an NC-unit-operated lathe will be described.

Figure 1:
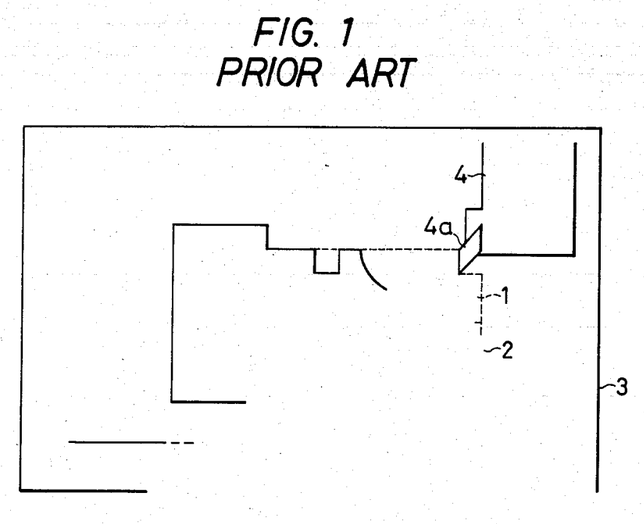
FIG. 1 is an explanatory diagram for a description of a conventional tool display method.

A conventional configuration display device of an NC-unit-operated lathe displays the configuration of a workpiece 1, the final configuration 2 of the workpiece 1, a display frame 3, a tool post 4 and a cutter 4a as shown in FIG. 1. The configurations of the tool post 4 and the cutter 4a are displayed using fixed patterns although they are actually somewhat variable depending on the type of the tool and how it is used, and sometimes can be much different from the actual ones.

Figure 2A:
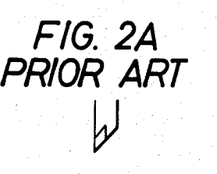
FIGS. 2A through 2D are explanatory diagrams for a description of the difficulties accompanying the conventional tool display method.
Figure 2B:
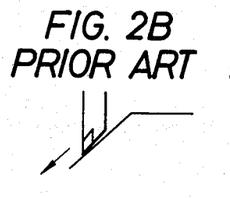
Figure 2C:
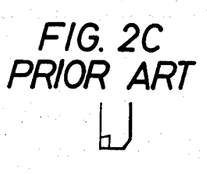
Figure 2D:
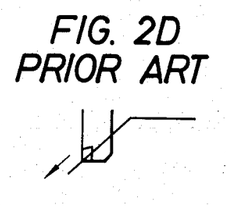

In the case where, for instance, a workpiece is machined with a tool shaped as shown in FIG. 2A, the machining operation is carried out as shown in FIG. 2B. However, since fixed patterns are employed to display tools, the tool is actually displayed as shown in FIG. 2C, for instance. Therefore, the positional relationship between the tool and the workpiece is as shown in FIG. 2D; that is, the tool actually interferes with the workpiece.

Furthermore, the tool mounting position and direction are also displayed by fixed patterns. Therefore, the conventional configuration display device suffers from a problem that the actual tool mounting position and direction cannot be accurately determined from the displayed configuration.

With the conventional method for displaying the configuration of a tool for an NC-unit-controlled lathe as described above, the configuration of a cutter mounted on the tool post may be closely similar to the displayed configuration, although the latter may be used as a symbol for the cutter. Thus, it is considerably difficult to determine the tool mounting direction and position from the displayed configuration, which makes the operation of the lathe intricate and results in erroneous operations of the lathe.

SUMMARY OF THE INVENTION

Accordingly an object of the invention is to eliminate the above-described difficulties accompanying a conventional tool display method for a lathe equipped with an NC control unit. More specifically, an object of the invention is to provide a tool display method for a lathe equipped with an NC control unit with which the configuration of a tool which is the same as the real configuration of the tool can be displayed.

Another object of the invention is to provide a tool display method for a lathe equipped with an NC control unit in which the actual shape and position of a tool, the tool mounting direction and cutter edge position can be determined from display modes.

A further object of the invention is to provide a tool display method for a lathe equipped with an NC control unit which eliminates erroneous operations of the lathe.

The foregoing objects and other objects of the invention have been achieved by the provision of a tool display method for a lathe equipped with a numerical control unit which comprises a numerical control unit body for controlling the lathe, the numerical control unit being connected to a configuration display device for displaying the configuration of a tool, which method comprises the steps of: storing a plurality of tool configuration types in a memory in the numerical control unit body; storing in the memory the dimensions of the configurations of cutters as functions with respect to a reference dimension according to the tool configuration types thus set; inputting a plurality of items of tool data by operating an input section in the numerical control unit body; selecting an optimum tool configuration according to the tool data thus inputted; calculating with an arithmetic section in the numerical control unit the dimensions of a cutter configuration according to the tool data with reference to the optimum tool configuration type thus selected; determining according to the tool data a tool mounting direction and whether or not a tool edge should be displayed; and determining a tool configuration according to the selected optimum tool configuration type, the calculated dimensions of the cutter configuration and the tool mounting direction, and, according to whether or not the tool edge should be displayed, synthesizing the tool configuration and a tool post configuration into a turret configuration and displaying the turret configuration on the configuration display device.

The nature, principle and utility of the invention will become more apparent from the following detailed description when read in conjunction with the accompanying drawings.

DESCRIPTION OF THE PREFERRED EMBODIMENTS

A tool display method for a lathe equipped with an NC control unit according to the invention will be described with reference to the drawings.

Figure 3A:
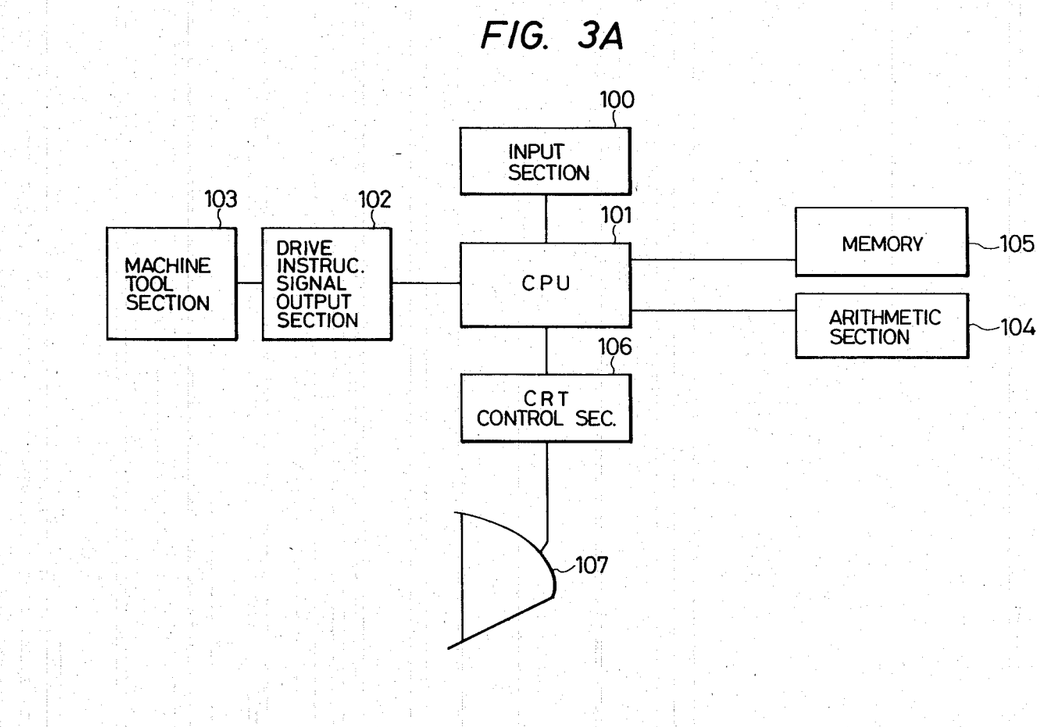
FIG. 3A is a block diagram showing the arrangement of a numerical control unit to which a tool display method according to the invention is applied.
Figure 3B:
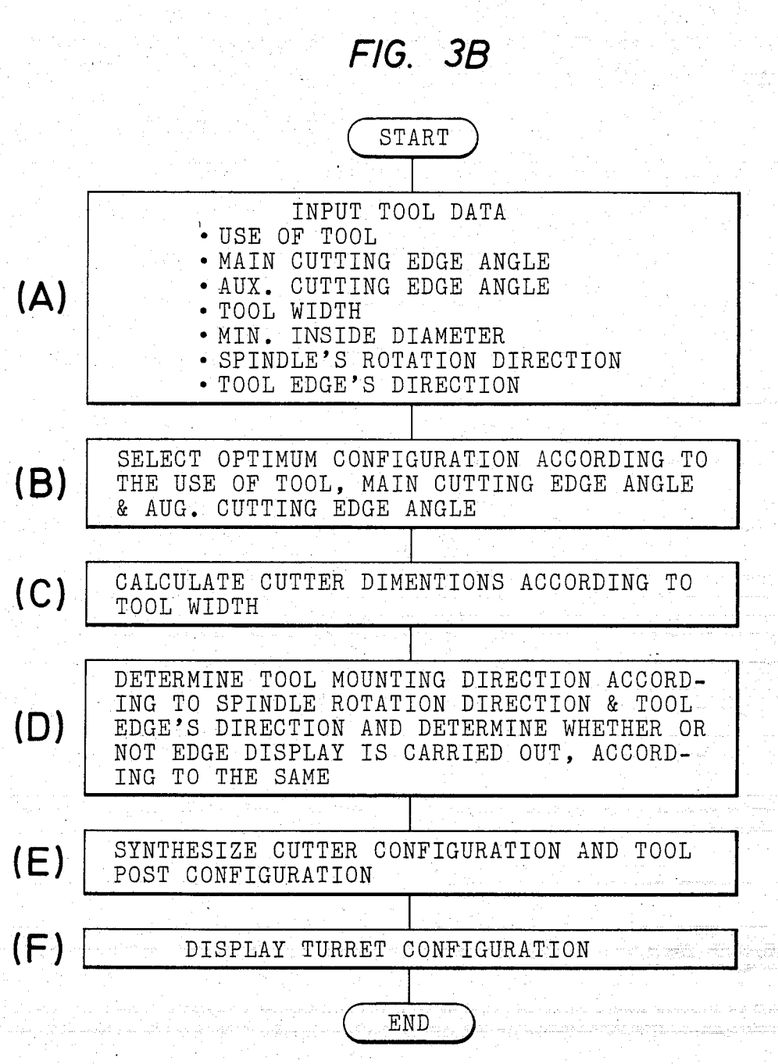
FIG. 3B is a flow chart for a description of the tool display method of the invention.

FIG. 3A is a block diagram showing an NC control unit to which the method of the invention is applied, and FIG. 3B is a flowchart showing the sequence of operations in a preferred embodiment of the invention.

In FIG. 3A, reference numeral 100 designates an input section; 101, a CPU (central processing unit); 102, a drive instruction signal output section; 103, a machine tool control section; 104, an arithmetic section; 105 a memory; 106, a CRT control section; and 107, a display unit (CRT). A sequence program, tool configuration forming element data, and a CRT control data program are stored in the memory 105.

When the input section 100 inputs, for instance, a main cutting edge angle of a tool, tool configuration forming element data corresponding thereto is read out of the memory 105. The numerical signals thereof are applied to the arithmetic section 104 where they are subjected to predetermined arithmetic operation to obtain a pattern. The pattern is converted into a configuration display signal which is used to effect a display the CRT 107.

This operation will be described with reference to the flowchart in FIG. 3B in more detail.

(A) First, tool data is inputted, as indicated in the flowchart. In the described preferred embodiment, seven tool data items are used, which are as follows:

(1) Use of Tool

Figure 4:
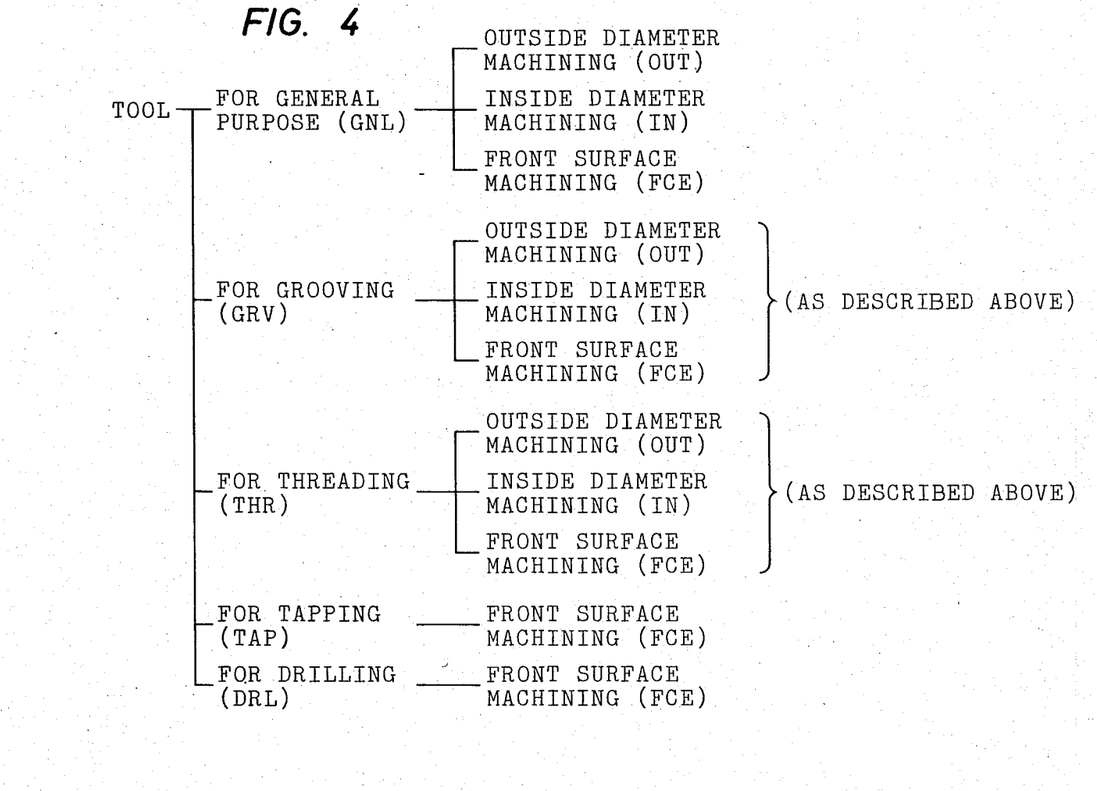
FIG. 4 is an explanatory diagram showing purposes of use of tools.

The use of a tool means the type of the tool and the part or parts which can be machined with the tool, as indicated in FIG. 4. For instance, when "GNL-OUT" is inputted as data on the use of a tool, an outside diameter machining general tool is set, and when "GRV-IN" is inputted, an inside diameter machining grooving tool is set.

Figure 5:
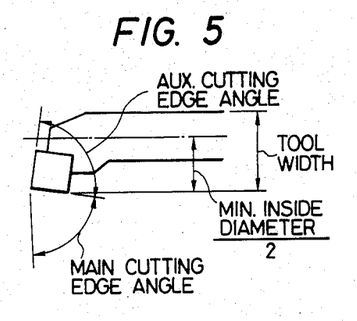
FIG. 5 is an explanatory diagram indicating tool data.

(2) Main Cutting Edge Angle A, Auxiliary Cutting Edge Angle B, Tool Width, and Minimum Inside Diameter FIG. 5 shows an example of an inside diameter machining general tool (GNL) or inside diameter machining threading tool (THR). A minimum inside diameter is set only in the case of an inside diameter machining (IN) tool, and it is unnecessary to set a minimum inside diameter in other cases.

(3) Spindle's Rotational Direction and Tool Edge's Direction

Figure 6A:
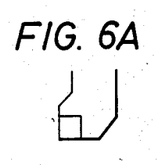
FIGS. 6A and 6B are explanatory diagrams for defining right and left machining directions.
Figure 6B:
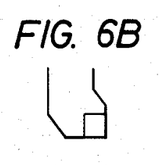

The rotational direction of the spindle is determined according to whether the tool is installed so that its edge is at the front or at the rear, and a right machining direction or a left machining direction is selected according to the machining direction of the tool. The right or left machining direction of a tool is the direction of the edge of the tool. When the edge is directed as shown in FIG. 6A, the tool has the left machining direction. When the edge is directed as shown in FIG. 6B, the tool has the right machining direction. The tool data is inputted by the input section 100 as described above.

(B) After the tool data has been inputted, an optimum configuration type is selected according to the use of tool, the main cutting edge angle, and the auxiliary cutting edge angle.

Figure 7:
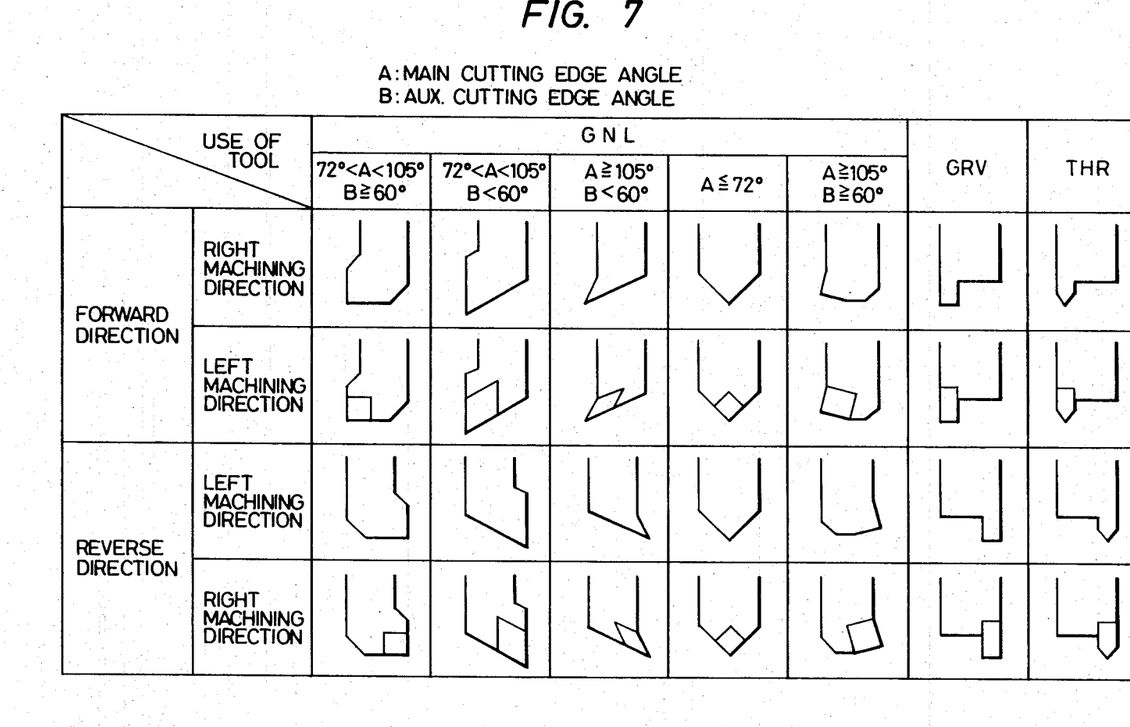
FIGS. 7 and 8 are matrix diagrams showing various tool edge configurations.
Figure 8:
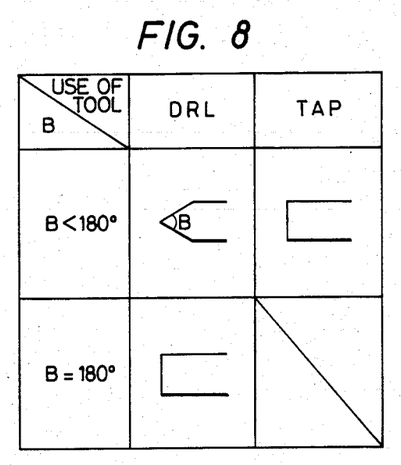

In selecting the optimum configuration type, as shown in FIG. 7 and 8, first a configuration type is selected according to the use of tool, and in the case of a general tool, it is selected according to the main cutting edge angle A and the auxiliary cutting edge angle B. These configuration types are stored as tool configuration forming element data in the memory 105 and are subjected to selection according to the input data from the input section 100 under the control of the CPU 101.

(C) The dimensions of a cutter are calculated according to a tool width C inputted as tool data.

Figure 9:
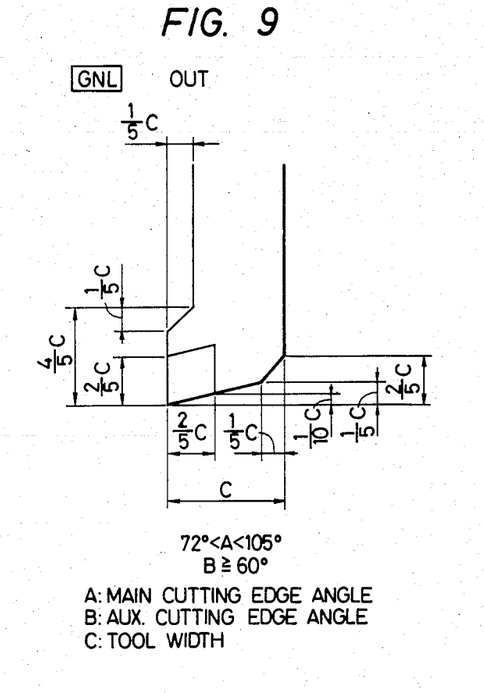
FIGS. 9 and 10 are explanatory diagrams showing examples of a method of determining the dimensions of a tool edge to form a configuration of the tool edge.
Figure 10:
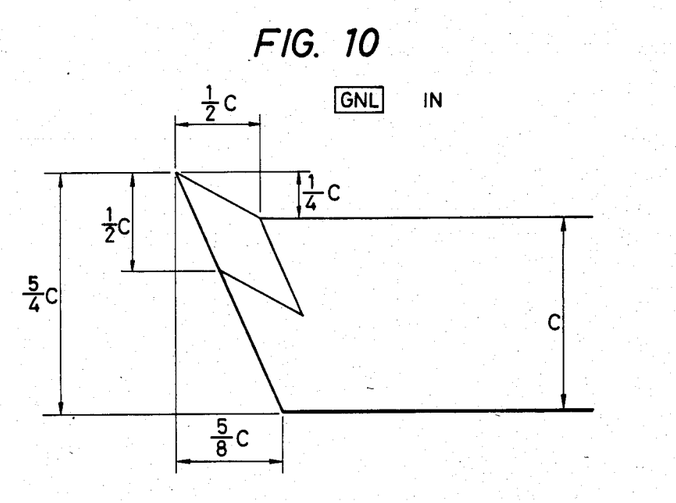

The arithmetic section 104 calculates the dimensions of a cutter according to a configuration pattern which is selected with the aid of the tool configuration forming element data in the memory 105. FIG. 9 illustrates an example of a method of determining the dimensions of an outside diameter machining tool (OUT), which is a general tool (GNL). The dimensions are calculated according to an inputted tool width C. Fig. 10 illustrates an example of a method for determining the dimensions of an inside diameter machining tool (IN), which is another general tool (GNL). The dimensions are calculated according to an inputted tool width C. The dimensions of other tools are also calculated substantially in the same manner as those described above.

(D) In accordance with a spindle rotational direction and a machining direction inputted by the input section 100, the configuration data obtained is subjected to auxiliary symmetric conversion with respect to the X axis and the Y axis with the edge point as a reference according to a matrix shown in FIG. 7.

For instance, in the case where in FIG. 7 the rotational direction of the spindle is a forward direction and the right machining direction is selected, the tool mounting direction is the left-hand direction and edge display is not carried out (which means that the tool is mounted with its edge at the front). In other words, in the case where the rotational direction of the spindle is the forward direction, the display of the edge is not carried out, indicative of the fact that the tool is mounted with the edge on the front. This is achieved as a result of a calculation which is performed by the arithmetic section 104 in response to an instruction from the CPU 101.

(E) A cutter configuration and a tool post configuration are synthesized together.

Figure 11A:
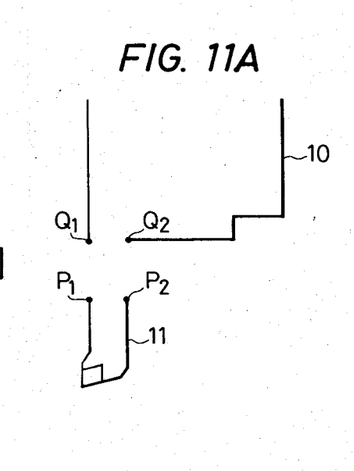
FIGS. 11A and 11B, taken together, are an explanatory diagram for a description of a method of synthesizing a cutter configuration and a tool post configuration into a single configuration.
Figure 11B:
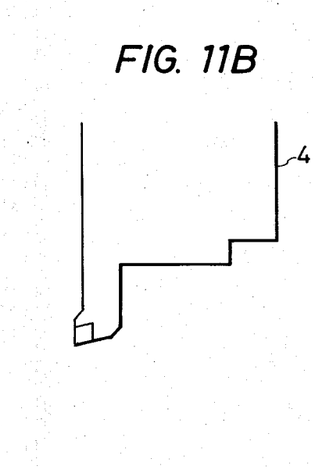

FIG. 11A shows examples of a tool post configuration 10 and a cutter configuration 11. In FIG. 11A, reference characters $Q_1$ and $Q_2$ designate the connecting points of the tool post configuration 10; and $P_1$ and $P_2$, the connecting points of the cutter configuration 1. The points $Q_1$ and $Q_2$ are connected to the points $P_1$ and $P_2$, respectively, as a result of which the two configurations are synthesized into a configuration as shown in FIG. 11B. The operation of the connection of these points is performed by the arithmetic section 104 using data from the memory 105 under the control of the CPU 101.

The configuration data thus obtained is displayed. That is, in the method of the invention, the configuration of the tool post and cutter is displayed on the display unit (CRT) 107 under the control of the CRT control section 106 as shown in FIG. 11B. Accordingly, the configuration displayed thereon is the same as the real configuration.

The embodiment of the invention has been described with reference to a two-axis lathe. However, the technical concept of the invention is effectively applicable to four-axis lathes.

In the above-described embodiment, the configurations of general tools are classified into several types according to the tool angles. As the tool angles are effectively indicative of the configurations of tools, the displayed configurations are completely the same as the real configurations (although the principle involved is more intricate).

As is apparent from the above description, the method of the invention has the following effects: In the tool configuration display of the lathe equipped with the NC unit, according to the tool data inputted, (1) a configuration to be displayed is synthesized, and the displayed configuration of the tool is therefore the same as the actual configuration, and (2) the tool mounting direction and the edge of the tool are displayed, and therefore the cutter mounting position and direction can be accurately indicated by the configuration display unit.

I claim:

1. A tool display method for a lathe equipped with a numerical control unit which comprises a numerical control unit body for controlling said lathe and a configuration display device connected to said control unit body for displaying the configuration of a tool, which method comprises the steps of:

storing a plurality of tool configuration types in a memory in said numerical control unit body;

storing in said memory dimensions of configurations of cutters as functions with respect to a reference dimension according to the tool configuration types thus stored;

inputting a plurality of items of tool data by operating an input section in said numerical control unit body;

selecting an optimum tool configuration type according to the tool data thus inputted;

calculating in an arithmetic section in said numerical control unit dimensions of a cutter configuration according to said tool data with reference to said optimum tool configuration type thus selected;

determining according to said tool data a tool mounting direction and whether or not a tool edge should be displayed; and determining a tool configuration according to said selected optimum tool configuration type, the calculated dimensions of said cutter configuration and said tool mounting direction and according to whether or not the edge of said tool should be displayed, synthesizing said tool configuration and a tool post configuration into a turret configuration, and displaying said turret configuration on said configuration display device.

2. The method as claimed in claim 1, in which said tool data includes a use of tool, a main cutting edge angle, an auxiliary cutting edge angle, a tool width, a minimum inside diameter, a spindle rotational direction, and a machining direction.

3. The method as claimed in claim 2, in which said optimum tool configuration type is selected according to input data including said use of tool, a main cutting edge angle, an auxiliary cutting edge angle and a minimum inside diameter.

4. The method as claimed in claim 3, in which said dimensions of said cutter configuration are calculated according to a tool width inputted as tool data.

5. The method as claimed in claim 4, in which said tool mounting direction is determined according to a spindle rotational direction inputted as tool data, and whether or not the edge of said tool should be displayed is determined according to a machining direction inputted as tool data.

6. The method as claimed in claim 2, in which the use of tool is one of general, grooving, threading, tapping or drilling purpose.

7. The method as claimed in claim 1, in which said configuration display device comprises a cathode-ray tube, said displaying step comprising the step of displaying said turret configuration on said cathode-ray tube.

* * * * *